United States Patent [19]
Davis

[11] Patent Number: 5,307,782
[45] Date of Patent: May 3, 1994

[54] COMBINED PRESSURE WAVE SUPPRESSOR, AIR/VAPOR PURGE AND CHECK VALVE

[75] Inventor: Leland L. Davis, Saline, Mich.

[73] Assignee: Davco Manufacturing Corporation, Saline, Mich.

[21] Appl. No.: 852,294

[22] Filed: Mar. 16, 1992

[51] Int. Cl.⁵ ............................................. F02M 55/04
[52] U.S. Cl. .................................. 123/510; 123/467; 123/447; 137/590
[58] Field of Search ............... 123/516, 447, 467, 510, 123/514, 512; 137/590, 587

[56] References Cited

U.S. PATENT DOCUMENTS

| | | | |
|---|---|---|---|
| 1,067,814 | 7/1913 | Higginson | 123/510 |
| 2,323,525 | 7/1943 | Ebel | 123/516 |
| 2,774,374 | 12/1956 | Schneider | 137/505.29 |
| 2,790,163 | 4/1957 | Armstrong | 123/447 |
| 2,878,889 | 3/1959 | Gilbert | 123/516 |
| 2,917,068 | 12/1959 | Davis | 137/590 |
| 3,326,264 | 6/1967 | Howard | 137/590 |
| 3,507,263 | 4/1970 | Long | 123/139 |
| 3,612,079 | 10/1971 | Schillinger | 137/590 |
| 4,161,964 | 7/1979 | Greiner | 123/447 |
| 4,264,287 | 4/1981 | Ishida et al. | 417/540 |
| 4,445,829 | 5/1984 | Miller | 417/543 |
| 4,554,902 | 11/1985 | Atkins | 123/510 |
| 4,590,796 | 5/1986 | Baatz | 73/113 |
| 4,649,884 | 2/1987 | Tulkey | 123/510 |
| 5,052,437 | 10/1991 | Danna | 137/590 |

FOREIGN PATENT DOCUMENTS

| | | |
|---|---|---|
| 0153695 | 7/1985 | European Pat. Off. . |
| 0261095 | 3/1988 | European Pat. Off. . |
| 3843840 | 6/1990 | Fed. Rep. of Germany . |
| 2314369 | 1/1977 | France . |
| 671443 | 5/1952 | United Kingdom . |
| 2022690 | 12/1979 | United Kingdom . |

*Primary Examiner*—Carl S. Miller
*Attorney, Agent, or Firm*—Basile and Hanlon

[57] ABSTRACT

A fuel pressure pulsation dampener valve is disclosed as having a housing with an internal chamber into which inlet and outlet tubes communicate to transfer fuel under pressure to the fuel injectors of an internal combustion engine. The outlet tube of the valve includes a plurality of ports which are positioned in the valve below the normal operating fuel level of the engine while the opening from the inlet tube through which fuel is supplied to the interior of the valve is positioned above such fuel level. A bleed orifice above the inlet tube opening communicates the interior of the valve to the return line of the fuel system.

22 Claims, 2 Drawing Sheets

COMBINED PRESSURE WAVE SUPPRESSOR, AIR/VAPOR PURGE AND CHECK VALVE

FIELD OF THE INVENTION

The present invention relates to fuel delivery systems and, in particular, to a fuel delivery system for transmitting fuel to combustion equipment such as diesel or mid-range distillate fueled combustion devices, gasoline, alcohol and other alternative fueled devices and the like.

BACKGROUND OF THE INVENTION

Fuel systems for internal combustion engines and, in particular, diesel, gasoline and turbine engines have a high pressure fuel pump which is actuated in timed relationship to deliver fuel under pressure to the combustion spaces of the engine. Examples are new generations of electrically-controlled diesel engines which have unit injectors and gasoline engines with injectors located at either the throttle body or at the individual cylinders. Air and fuel vapor can cause malfunctions or "vapor lock" in these systems and prevent proper metering of fuel for injection and proper combustion. The emerging new diesel and gasoline/gasohol engines which utilize injectors operate with an excess of fuel which is returned to fuel tanks, tending to create pressure pulsations as they open and close during normal operation. When a flowing liquid is suddenly stopped, interrupted or exposed to certain valving action a pressure wave is created since the fluid is not sufficiently elastic to absorb the energy or pressure waves or pulsations created in the fluid. The pulsations travel back through the incoming column of fuel to the fuel pump and other components such as sensors where the pulsations may cause fatigue damage, decrease the efficiency of the fuel pump and harm valves, gaskets, fasteners, sensors and other fuel system components.

It is therefore desirable to provide a method for such systems which will reduce the magnitude of the pressure pulsations caused by the sudden closing of valves or injectors with the abrupt halting of moving fluid, which will also automatically function to purge any entrained air, gas or vapor from the fluid which is flowing through the system between the fuel pump and the internal combustion engine. It would also be desirable to provide such a system which would function to check excessive back flow or siphoning of fluids without the need of a valve having moving parts which requires close tolerance surfaces and that may create a restriction of the fluid flow in the system as would be typical when using a check valve with weights or springs.

SUMMARY OF THE INVENTION

The present invention, which is described in greater detail herein, comprises a valve disposed between a fuel pump and the fuel injectors and/or gallery of an internal combustion engine for reducing pressure pulsations or "spikes" to levels which will not injure the engine components or degrade engine operation. This is accomplished by providing a housing having an internal chamber within which an inlet tube extends and opens at a predetermined level therein to communicate fuel under pressure from the fuel pump to the valve chamber. An outlet tube extending into the valve chamber is provided with a plurality of outlet ports for communicating fuel from the chamber to the engine. The outlet tube has a plurality of outlet ports opening into the valve chamber at a point below the aforementioned predetermined level. Pulsations generated downstream of the outlet tube within the internal combustion engine are dissipated in the valve chamber.

The valve is designed to automatically purge entrained air and gas vapor which may cause erratic fuel system operation, loss of fuel injection, improper and erratic combustion due to the effect of the air/vapor lessening or stopping fuel fluid flow o causing unequal amounts of fuel to be delivered to the individual combustion chambers.

The valve functions as an anti-siphoning check valve to prevent a reverse flow of fluid that will otherwise lower the level of fuel at or near the fuel injectors or burner valves, this being accomplished without the need for moving parts such as springs, balls, disc, mushroom or other type valves and without any noticeable pressure losses or flow restrictions within the fuel system.

It is therefore an object of the present invention to provide a valve which will reduce the magnitude of pressure pulsations, automatically purge entrained air, gases and the like while functioning as an anti-siphoning check valve in one valve.

It is another objective of the present invention to provide such a valve which is small, compact, inexpensive to manufacture and assembly, and easy to install and operate without the need for routine maintenance.

Another objective of the present invention is to provide a valve of the type described which will function at low temperatures with mid-range oils, such as home heating and diesel fuel, without creating blockages due to paraffin, gelled fuel or ice build-up on critical parts and surfaces such as seating surfaces which is common to many check valves now in use.

It is a further objective of the present invention to provide a valve which is so designed and configured to permit wax and/or gelled fuel to flow through its inlet and outlet ports in such a manner that the pressure pulsations generated by the engine will dissipate within the valve while at the same time dissolving wax crystals. Ice which may form will be located at the bottom of the valve away from the flow inlet/outlet ports and any bleed orifices.

Other objectives, advantages and applications of the present invention will become apparent to those skilled in the art when the accompanying description and preferred embodiments of the present invention is read in conjunction with the accompanying drawings.

BRIEF DESCRIPTION OF THE DRAWING

The description herein makes reference to the accompanying drawings where like reference numerals refer to like parts throughout the several views and wherein.

DESCRIPTION OF THE PREFERRED EMBODIMENTS

Figure 1:
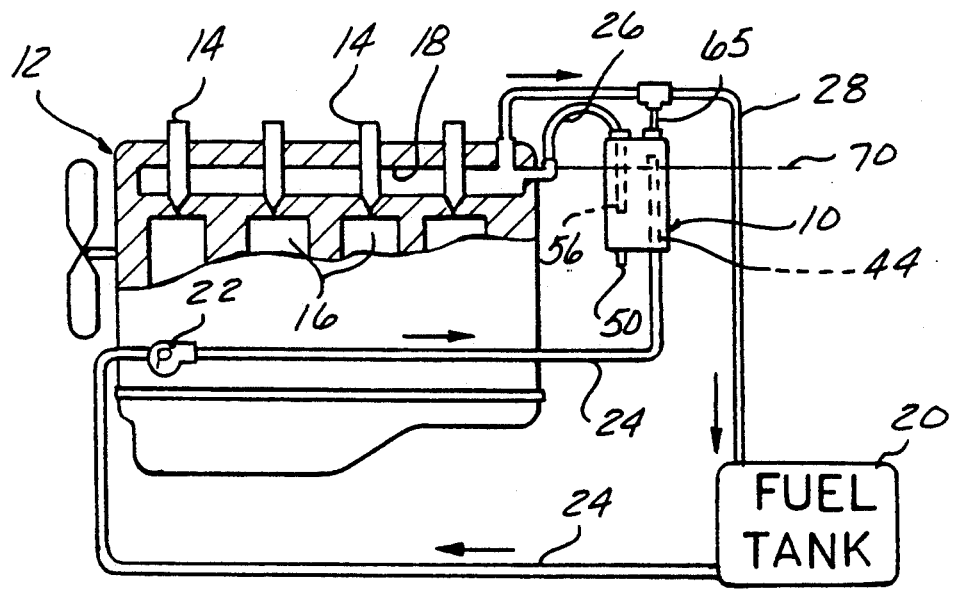
FIG. 1 is a pictorial view of an internal combustion engine showing the invented valve being employed in the fuel system thereof.
Figure 2:
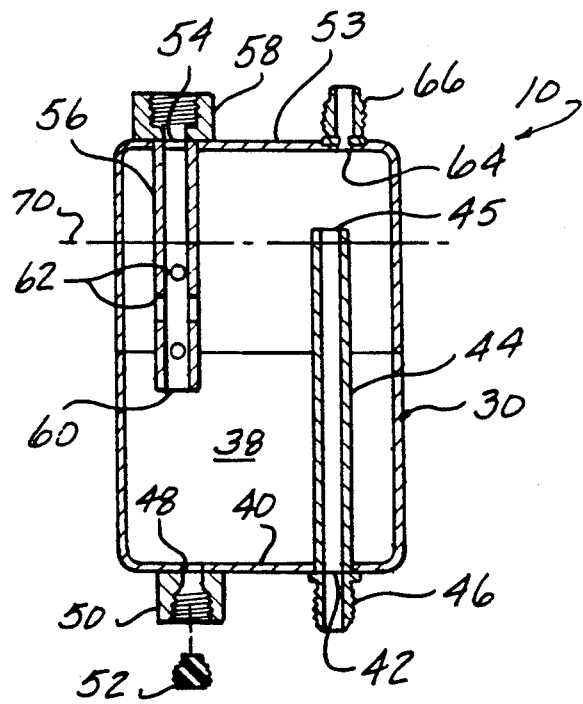
FIG. 2 is a longitudinal cross-sectional view through the invented valve illustrated in FIG. 1.

Referring now to the drawings and, in particular, to FIGS. 1 and 2 wherein there is illustrated one example of the present invention in the form of a fuel pressure pulsation dampener valve 10 which is used in the fuel supply of an internal combustion engine 12. Engine 12 is of the type that utilizes unit injectors 14 to communicate a predetermined amount of fluid under pressure to the chambers 16 of the engine 12 for combustion therein in the conventional manner. Fuel is communicated to each of the injectors 14 through a fuel gallery 18. While the preferred embodiment of the present invention is disclosed in connection with an internal combustion engine 12 and is utilizing diesel fuel, it should be understood that the invention may find equal application with use in gasoline and alternate fueled and gasohol fueled engines. In the internal combustion engine fuel stored in a fuel tank 20 is delivered under pressure by means of a fuel pump 22 and fuel conduit 24 to the valve 10. Fuel is hen communicated from the valve 10 through a fuel feed line 26 to the fuel gallery 18. As is conventional with the diesel engines utilizing unit injectors 14, the same operate such that excess fuel is returned from the fuel gallery 18 to the fuel tank 20 via a fuel return line 28.

As can best be seen in FIG. 2, the fuel pressure pulsation dampener valve 10 comprises a housing 30 having an internal chamber 38. The bottom wall 40 of the housing 30 has an aperture 42 through which an inlet tube 44 extends. The lower end of the inlet tube 44 is connected through a suitable fitting 46 to the inlet line 24 while the upper end of inlet tube 44 terminates in an opening or port 45 communicating with the housing chamber 38. The lower wall 40 further includes an optional second aperture 48 which constitutes a drain 50 that is opened and closed by means of a plug or valve 52, the purpose of which will be described hereinafter.

The top wall 53 of the upper cup-shaped section 32 is provided with an aperture 54 which communicates an outlet tube 56 to the fuel line 26 via suitable fitting 58. Outlet tube 56 has an enlarged opening or port 60 at the bottom end thereof communicating with the housing chamber 38. The outlet tube 56 further comprises a plurality of peripheral ports 62 which in conjunction with the port 60 are sized and spaced to effectively dampen the energy of any pressure pulsation wave generated by the injectors 14. The size and number of the ports 60-62 will be determined according to the frequency and magnitude of the pressure pulsations to be dissipated. Persons skilled in the art will be able to determine such sizes based on the size of the engine. In a preferred embodiment, four pair of ports are provided and are sized 0.010, 0.020, 0.040 and 0.080 inches in diameter. The unit is adapted for particular use in a diesel engine of 8-12 liters and 300-500 hp.

The top wall 53 of the housing 30 is provided with a second aperture 64 which forms an orifice that is adapted to communicate the interior chamber 38 to the return line 28 through a conduit 65 attached thereto by fitting 66. In the present embodiment, the orifice is sized at 0.020 inch to bleed air and vapor to the fuel return line 28 but maintain the desired pressure of 70 psi.

As can best be seen in FIG. 1, the fuel level in the fuel gallery 18 that must be maintained for proper engine operation is indicated by the line 70. This is accomplished by having the port 45 of the inlet pipe 44 communicating with the chamber 38 (FIG. 2) at a point above the fuel level 70 while the ports 60-62 of the outlet tube 56 open into the chamber 38 at a point below the level 70 (FIG. 2). This arrangement insures that the fuel will be maintained at or above the desired level.

In operation, fuel under pressure is delivered via fuel pump 22 and conduit 24 to the interior chamber 38 filling the same with fuel which flows through ports 60-62 of outlet tube 56 and to the fuel gallery 18 via conduit 26. Excess fuel in the fuel gallery 18 is communicated back to the fuel tank 20 via return line 28. A dampening action of the pulsations is further enhanced by the bleed orifice 64 which constantly returns fuel to the fuel tank 20 via conduits 65 and 28. Residual pressure spikes or pulsation energy after passing through ports 60 and 62 will expend any remaining energy by forcing additional fuel through the bleed orifice 64.

The valve 10 functions also as an effective check valve when mounted vertically as shown in FIGS. 1 and 2 with the opening 45 of the fuel inlet tube 44 at a level slightly higher than the desired fuel level 70 to be maintained within the fuel gallery, injector, throttle body or burner. Upon stopping the flow of fuel, the fuel will flow back to the level of inlet port 45 only since the vacuum necessary for siphoning will be broken by the line 65 attached to the bleed orifice 64 allowing air to enter the valve 10 to the level of the opening 45 of inlet 44. Upon restart of the engine 12 or pump 22 the air is quickly purged by incoming fuel such that the air will exit the bleed orifice 64 and be returned to the reservoir 20 or other suitable receptacle where the air can escape to atmosphere.

The optional drain provision 50 is provided so that servicing is facilitated to permit draining as may be required. The drain 50 also complies with regulations such as United Coast Guard for Marine Installations that mandate a suitable drain means to all fuel-containing components. Any ice which may form or collect in the housing 30 will be in the bottom of lower housing portion 34 away from the fuel ports 45, 60-62 and bleed orifice 64 and not block fuel flow.

During operation fuel enters the valve 10 through the inlet tube 44 and as the fuel level rises any air in chamber 38 is displaced by fuel which flows through the outlet tube 56 to fuel feed line 26 and bleed orifice 64 to the return line 28. Pressure pulsations or spikes generated by the injectors or valve action travel through the incoming fuel back to the outlet tube 56 and through ports 60-62, which, as aforementioned, are sized and arranged to divide and dissipate the energy by releasing pulsations sequentially into the incoming fuel within the valve 10 and to vent fuel air vapor through the bleed orifice 64. Any paraffin or gelled fuel in the fuel outlet tube will be dissolved due to the action of the pulsations dissipating.

Figure 3:
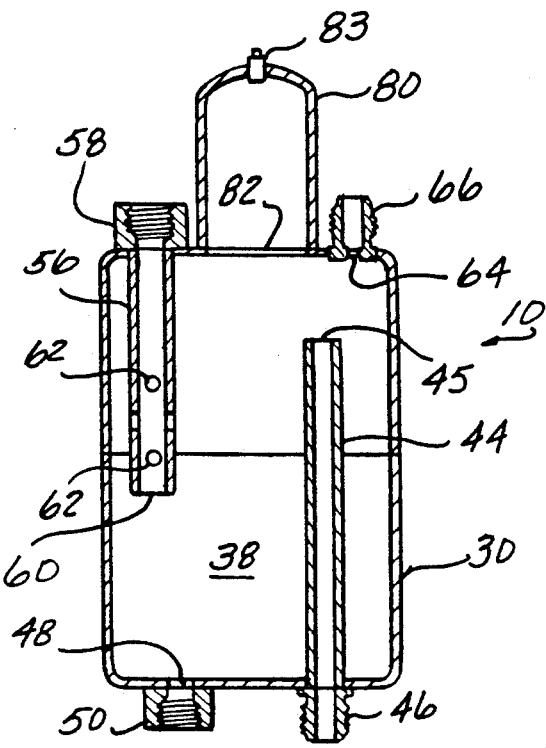
FIGS. 3-5 are longitudinal cross-sectional views similar to the valve illustrated in FIG. 2 illustrating different embodiments of the present invention.

The dampening or elimination of the pressure pulsations can be enhanced by the addition of a dome 80 as illustrated in FIG. 3. The dome 80 may be opened at the bottom so as to trap air which will be compressed therein to aid in the cancellation of pressure pulsations. If desired, a expandable membrane 82 may be attached to the bottom of the dome 80 to enclose the same and permit the pressurizing of the dome 80 with a suitable gas via valve 83. The pressurized dome 80 will expand and retract under the influence of pressure pulsations in an accumulator fashion to further dampen the pulsations.

Figure 4:
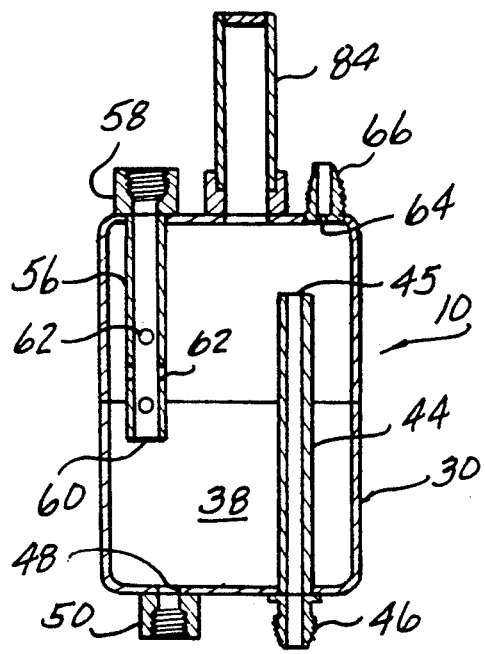
Figure 5:
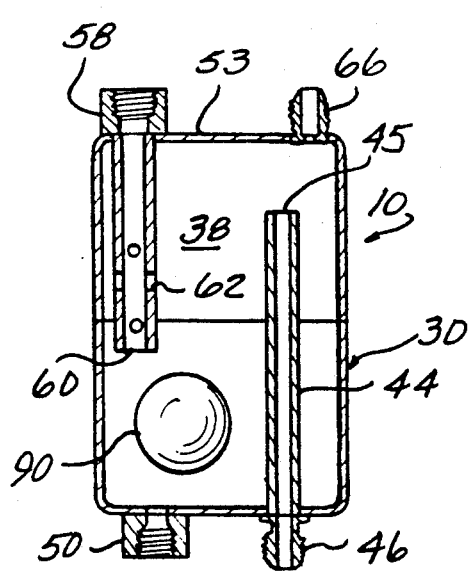

An alternate version of the dome 80 is illustrated in FIG. 4, in the form of a standpipe 84 which will function in a similar manner to provide an additional volume of air to dampen or otherwise cancel the pressure pulsations that are not completely eliminated within the chamber 38. FIG. 5 illustrates yet another alternate embodiment of the present invention which utilizes a compressible member such as hollow sphere 90 that is made from a compressible plastic, rubber or other material which can be compressed under pressure to aid in the damping of pulsations.

It will be understood by those skilled in the art that while the present invention is intended primarily for use with diesel engines, the invention has broad applications for gasoline, methanol (alcohol) jet, turbine, steam and other type power plants which utilize pressurized or gravity flow liquid fuel delivery systems intended to operate at a pressure above surrounding atmospheric levels. The present invention also has applications for other uses such as hydraulic and fluid processing systems where air and/or vapor cushions may detract from performance and where unwanted pressure pulsations need to be released or eliminated.

I will be understood by those skilled in the art that other forms of the present invention may be had, all coming within the spirit of the invention and the scope of the appended claims.

What is claimed is as follows:

1. A fuel delivery system for an internal combustion engine, of the type having at least one fuel injector, said system comprising:
    a source of fuel;
    means for delivering said fuel under pressure to said injector;
    a return conduit from said injector for returning unused fuel from said injectors to said source of fuel; and
    a fuel pressure pulsation dampener valve disposed between said source of pressure and said injector such that fuel is delivered under pressure through said valve to said injector, said valve comprising:
    a housing having an interior chamber;
    an inlet tube extending into said chamber and having a port opening into said chamber at a predetermined level for communicating fuel from said source into said chamber; and
    an outlet tube extending into said chamber and having a plurality of ports opening into said chamber at a point below said predetermined level for communicating fuel in said chamber to said outlet tube for communication of said fuel to said injector and for dissipating pulsations generated downstream of said outlet tube ports and communicated to said chamber.

2. The fuel pressure pulsation dampener valve defined in claim 1, further comprising a bleed orifice opening into said chamber above said predetermined level, said bleed orifice communicating with said return conduit and functioning to automatically purge entrained air and vapor from said valve chamber.

3. The fuel pressure pulsation dampener valve defined in claim 1, further comprising a drain valve located at the lower portion of said chamber for selectively draining fluid from within said chamber.

4. The fuel pressure pulsation dampener valve defined in claim 1, further comprising a compressible chamber in communication with said first mentioned chamber to dampen said pulsations.

5. The fuel pressure pulsation dampener valve defined in claim 4, wherein said second compressible chamber comprises a compressible member within said first chamber.

6. The fuel pressure pulsation dampener valve defined in claim 4, wherein said second compressible member comprises a second housing connected to an opening to the interior of said first chamber of said first mentioned housing.

7. The fuel pressure pulsation dampener valve defined in claim 6, wherein the chamber of said first housing and the chamber of said second housing are separated by a flexible membrane, said second housing chamber having a pressurized fluid therein.

8. A fuel pulsation dampener valve comprising:
    a housing having an interior chamber;
    an inlet tube extending into said chamber and having a port opening into said chamber at a predetermined level for communicating fuel into said chamber;
    an outlet tube extending into said chamber and having a plurality of ports for communicating fuel in said chamber to said outlet tube for communication of said fuel downstream of said chamber, said outlet tube ports opening into said chamber at a point below said predetermined level whereby pulsations generated downstream of said outlet tube ports are dissipated in said chamber; and
    a compressible chamber in communication with said first mentioned chamber to dampen said pulsations.

9. The fuel pressure pulsation dampener valve defined in claim 8, wherein said second compressible chamber comprises a compressible member within said first chamber.

10. The fuel pressure pulsation dampener valve defined in claim 8, wherein said second compressible member comprises a second housing connected to an opening communicating with the interior of said first chamber of said first mentioned housing.

11. The fuel pressure pulsation dampener valve defined in claim 10, wherein the chamber of said first housing and the chamber of said second housing are separated by a flexible membrane, said second housing chamber having a pressurized fluid therein.

12. A fuel delivery system for an internal combustion engine, of the type having at least one fuel injector, said system comprising:
    a source of fuel;
    means for delivering said fuel under pressure to said injector;
    a return conduit from said injector for returning unused fuel from said injectors to said source of fuel;
    a fuel pressure pulsation dampener valve disposed between said source of pressure and said injector such that fuel is delivered under pressure through said valve to said injector, said valve comprising:
    a housing having an interior chamber;
    an inlet tube extending into said chamber and having a port opening into said chamber at a predetermined level for communicating fuel from said source into said chamber; and
    an outlet tube extending into said chamber and having a plurality of ports for communicating fuel in said chamber to said outlet tube for communication of said fuel to said injector, said outlet tube ports opening into said chamber at a point below said predetermined level whereby pulsations generated downstream of said outlet tube ports are dissipated in said chamber.

13. The fuel pressure pulsation dampener valve defined in claim 12, further comprising a bleed orifice opening into said chamber above said predetermined level, said bleed orifice communicating with said return conduit and functioning to automatically purge entrained air and vapor from said valve chamber.

14. The fuel pressure pulsation dampener valve defined in claim 12, further comprising a drain valve located at the lower portion of said chamber for selectively draining fluid from within said chamber.

15. The fuel pressure pulsation dampener valve defined in claim 12, further comprising a compressible chamber in communication with said first mentioned chamber to dampen said pulsations.

16. The fuel pressure pulsation dampener valve defined in claim 15, wherein said second compressible chamber comprises a compressible member with said first chamber.

17. The fuel pressure pulsation dampener valve defined in claim 15, wherein said second compressible member comprises a second housing connected to an opening communicating with the interior of said first chamber of said first mentioned housing.

18. The fuel pressure pulsation dampener valve defined in claim 17, wherein the chamber of said first housing and the chamber of said second housing are separated by a flexible membrane, said second housing chamber having a pressurized fluid therein.

19. A fuel pulsation dampener valve for a fuel injected engine, said valve comprising:
a housing having an enclosed interior chamber;
an inlet tube extending into said chamber and having a port opening into said chamber at a first predetermined level for communicating fuel under pressure into said chamber;
an outlet tube extending into said chamber and having a plurality of ports opening into said chamber for communicating fuel under pressure from said chamber to said outlet tube for communication of said fuel downstream of said chamber and for dissipating pulsations generated downstream of said outlet tube ports by the injectors of said engine and communicated to said chamber; and
a compressible chamber in communication with said first mentioned chamber to dampen said pulsations.

20. The fuel pressure pulsation dampener valve defined in claim 19, wherein said second compressible chamber comprises a compressible member within said first chamber.

21. The fuel pressure pulsation dampener valve defined in claim 19, wherein said second compressible member comprises a second housing connected to an opening communicating with the interior of said first chamber of said first mentioned housing.

22. The fuel pressure pulsation dampener valve defined in claim 21, wherein the chamber of said first housing and the chamber of said second housing are separated by a flexible membrane, said second housing chamber having a pressurized fluid therein.

* * * * *

UNITED STATES PATENT AND TRADEMARK OFFICE
CERTIFICATE OF CORRECTION

PATENT NO. : 5,307,782
DATED : May 3, 1994
INVENTOR(S) : Leland L. Davis

It is certified that error appears in the above-identified patent and that said Letters Patent is hereby corrected as shown below:

Column 2, line 11, please delete "o" and insert --or--.

Column 3, line 22, please delete "hen" and insert --then--.

Signed and Sealed this

Twenty-third Day of August, 1994

Attest:

BRUCE LEHMAN

Attesting Officer

Commissioner of Patents and Trademarks